Dec. 4, 1956

H. K. ERAUT 2,772,934

FOOD SERVICE TRAY

Filed Aug. 1, 1955

INVENTOR.
Harold K. Eraut
BY
AGENT

Dec. 4, 1956 H. K. ERAUT 2,772,934
FOOD SERVICE TRAY
Filed Aug. 1, 1955 2 Sheets-Sheet 2
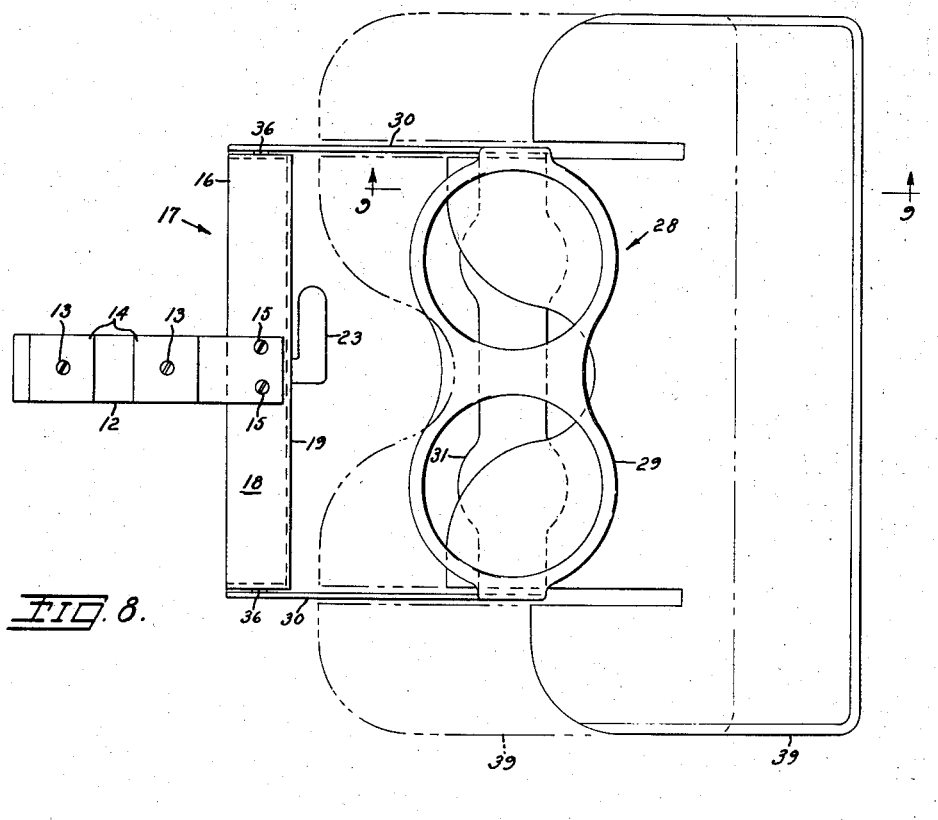
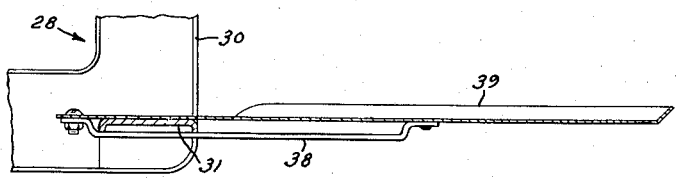
INVENTOR.
Harold K. Eraut
BY
AGENT United States Patent Office 2,772,934
Patented Dec. 4, 1956

2,772,934

FOOD SERVICE TRAY

Harold K. Eraut, Portland, Oreg.

Application August 1, 1955, Serial No. 525,588

1 Claim. (Cl. 311—21)

This invention relates generally to food service trays and more particularly to food service trays of the type adapted for use in automobiles.

It is a particular object of the invention to provide a food service tray combination for use at the front seat of an automobile, which tray will usually be positioned out of sight but when wanted can easily and quickly be swung into a position of use.

It is a second object to provide a stationary hinging frame, which can be permanently secured under the instrument panel of an automobile.

It is a third object to provide a basic tray structure adapted to be hinged about a transverse horizontal axis on the hinging frame.

It is a fourth object to provide the stationary hinging frame with latch means, which when released allows the tray to be swung freely from a forward position in which the tray is inverted out of the way under the instrument panel to a position of use in which the tray in an upright position extends from the instrument panel into the front seat compartment of the car.

It is a fifth object to provide the basic tray with a pair of compartments for receiving temporarily a pair of containers for liquid refreshments.

It is a sixth object to provide the basic tray with a substantially horizontal tray surface for supporting solid foods or the like.

It is a seventh object to provide a substantially horizontal tray surface slidably attached to the basic tray for movement towards or away from the frame so that the tray surface may be extended for use or restricted for storage.

How these and other objects are attained is explained in the following descriptions referring to the attached drawings in which:

Fig. 8 is a plan view similar to Fig. 1, but additionally showing the two extreme positions of the additional tray surface slidably attached.

Fig. 9 is a fragmental section along the line 9—9 of Fig. 8.

Like numerals of reference refer to like parts in the several figures of the drawings.

Figure 1:
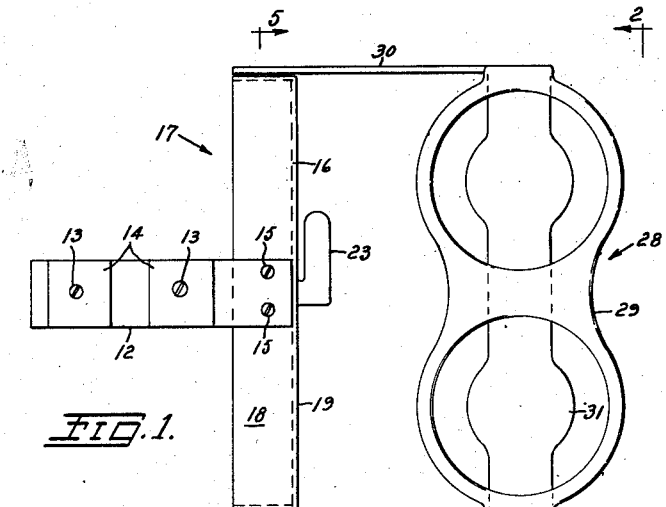
Fig. 1 is a plan view of the hinging frame, the basic tray structure, and a mounting strap of a preferred form of this invention.
Figure 2:
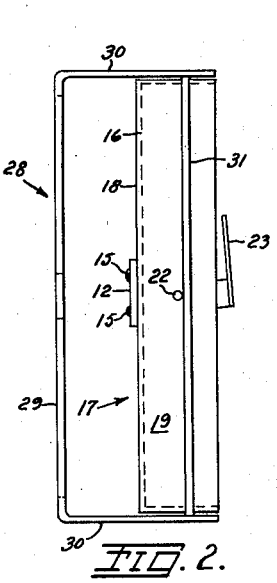
Fig. 2 is a front elevation of the device of Fig. 1 viewed in the direction 2—2 of Fig. 1.

Referring now to the drawings, reference numeral 11 refers to the fragmentary showing of the instrument panel of the automobile to which the tray mounting strap 12 is secured by screws 13 and square washers 14. Secured to strap 12 by screws 15 is body 16 of stationary hinging frame 17. Body 16 is seen to have been formed of a sheet of metal, cut, folded and welded to form a top side 18, a front side 19 and two vertical ends 20 and 21.

Secured into side 19 is headed stud 22 on which is pivoted latch operating lever 23, having its lower end formed forwardly and to one side for easy manipulation, as shown. Latch operating links 24 and 25 are formed at their inner ends with right-angled lugs 26 and 27 extending through holes as shown in lever 23.

Figure 3:
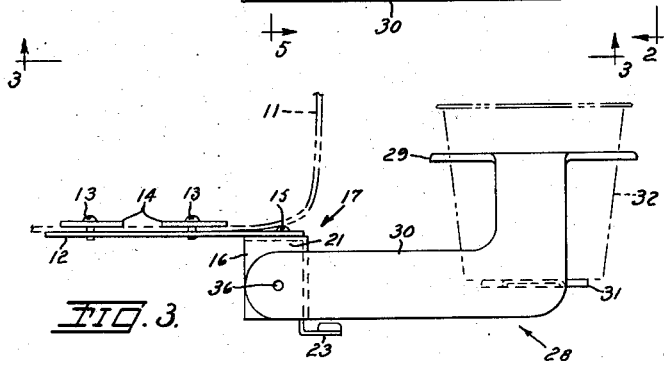
Fig. 3 is a side elevation of the device of Fig. 1 viewed in the direction 3—3 of Fig. 1 and showing a fragment of the automobile instrument panel in dotted outline.

Basic tray structure 28 is seen to be formed with a top member 29, two L-shaped side members 30, and a bottom member 31 welded between side members 30 to form a bottom support for liquid containers like 32, shown dotted in Fig. 3 and setting through holes formed in top member 29 for the purpose as shown.

Figure 6:
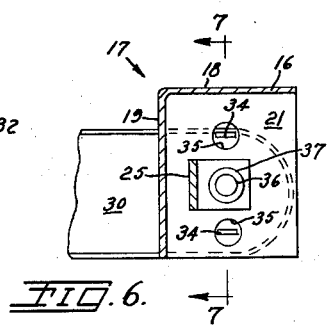
Fig. 6 is a fragmental section along the line 6—6 of Fig. 5.
Figure 4:
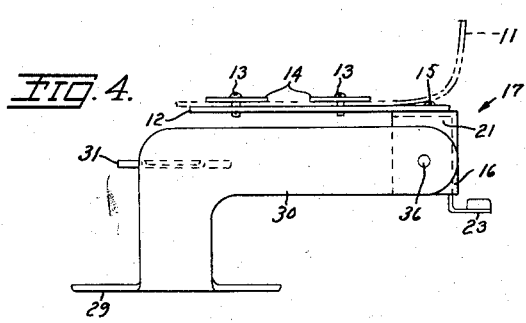
Fig. 4 is a side elevation similar to Fig. 3, but showing the basic tray swung to an inverted position under the instrument panel for storage.
Figure 7:
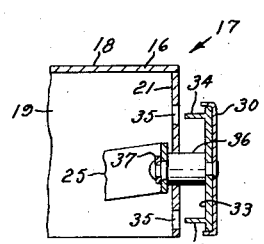
Fig. 7 is a fragmental section along the line 7—7 of Fig. 6.
Figure 5:
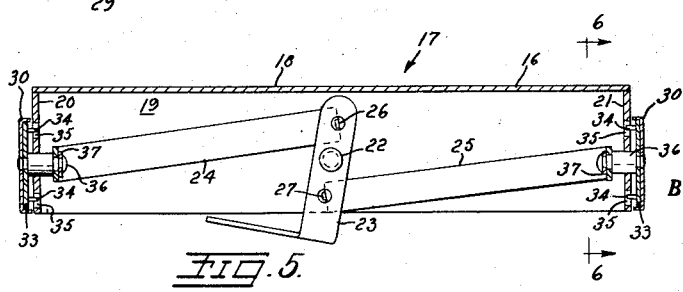
Fig. 5 is a sectional elevation along the line 5—5 of Fig. 1 to show the tray latching means of this invention.

Secured into each of the free ends of side members 30, as shown in Figs. 5 and 7, are latch plates 33, each having a pair of inwardly extending ears 34, see also Fig. 6. When tray structure 28 is in either its forward or backward horizontal position as shown in Figs. 3 and 4, ears 34 of latch plates 33 extend inwardly through the two vertically aligned holes 35 in each of the ends 20 and 21 of body 16.

Reduced at their outer ends and riveted one each to side members 30 and latch plates 33 are axle studs 36 journalled in holes formed through ends 20 and 21 of body 16, as shown. Axle studs 36 are twice reduced in diameter at their inner ends; first, to extend through holes formed in the forwardly extending outer ends of latch links 24 and 25, respectively, and second, to extend through washers 37 held thereon by peening the end of studs 36.

Basic tray structure 28 is made of material sufficiently resilient to allow the free end of latch lever 23 to be pressed downwardly to rotate lever 23 counter-clockwise, as seen in Fig. 5, to move links 24, 25 endwise outwardly to press studs 36 and side members 30 of tray 28 outwardly to release ears 34 of latch plates 33 from holes 35 in ends 20, 21 of body 16 of stationary hinging frame 17. When latch lever 23 is depressed, tray 28 will of its own weight hinge about studs 36 and depend downwardly from which position it can be moved by hand to either of its positions shown in Figs. 3 and 4, where it will be latched by ears 34 entering holes 35 under the bias of resilient side members 30.

Slidably secured on bottom member 31 of tray structure 28 by a pair of laterally spaced straps 38, shown typically in Fig. 9, is extension tray 39, shown in Fig. 8, in its extended position. Also in Fig. 8, extension 39 is shown by broken lines in its retracted position. Usually extension 39 would be pushed to its retracted position before tray 28 is returned to the position shown in Fig. 4 and would be pulled to its extended position when tray 28 is in its position of use, shown in Fig. 3.

Having stated some of the objects of my invention, illustrated and described a preferred form in which my invention may be practiced and explained its operation, I claim:

In a food service tray combination which includes a stationary hinge bracket, a tray, means for securing said bracket to a support, hinging means hingedly securing said tray to said bracket, latching means cooperatively formed on said bracket and said support for latching said tray in a service position with respect to said bracket and unlatching means carried on said bracket manually operable to release said tray for rotation about the hinging axis of said hinging means to a storage position: the combination of a pair of laterally spaced opposite end faces formed on said bracket, a pair of laterally spaced opposite end faces formed on said tray to mate respectively with the adjacent end faces on said bracket, one of said pair of laterally spaced opposite end faces being formed with a pair of coaxial bearing holes therethrough, a pair of coaxial journals secured respectively to the other of said pair of opposite end faces to extend oppositely through said bearing holes hingedly to support said tray on said bracket, means resiliently supporting one of said opposite end faces at one end of said bracket and said tray for lateral movement with respect to the other of said end faces, latch means cooperatively formed on said resiliently supported one of one of said pair of said opposite end faces and the adjacent one of the other of said pair of said opposite end faces to latch said tray in a service position with respect to said bracket and lever means pivotally carried on said bracket manually operable to displace said resiliently supporting means to separate said faces on which said latch means are cooperatively formed to release said tray for rotation to a storage position.

References Cited in the file of this patent

UNITED STATES PATENTS

| | | |
|---|---|---|
| 1,576,034 | Butt | Mar. 9, 1926 |
| 1,863,368 | Folmer | June 14, 1932 |
| 2,125,476 | Westrope et al. | Aug. 2, 1938 |
| 2,270,948 | Howe | Jan. 27, 1942 |
| 2,454,889 | Shelton et al. | Nov. 30, 1948 |
| 2,475,202 | Sammons | July 5, 1949 |
| 2,574,250 | Dalton | Nov. 6, 1951 |
| 2,605,156 | Laxo | July 29, 1952 |
| 2,723,173 | McBride | Nov. 8, 1955 |